Figure 1:
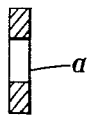

Feb. 13, 1940.  R. J. ELSOME-JONES ET AL  2,189,887
DRY CONTACT METAL RECTIFIER
Filed Feb. 25, 1936  2 Sheets-Sheet 1

INVENTORS
R.J. ELSOME-JONES
L.J. ELLISON
BY RC Hopgood
ATTORNEY

Feb. 13, 1940. R. J. ELSOME-JONES ET AL 2,189,887
DRY CONTACT METAL RECTIFIER
Filed Feb. 25, 1936 2 Sheets-Sheet 2

INVENTORS
R. J. ELSOME-JONES
L. J. ELLISON
BY R.C. Hopgood
ATTORNEY

Patented Feb. 13, 1940

2,189,887

UNITED STATES PATENT OFFICE 2,189,887

DRY CONTACT METAL RECTIFIER

Ronald Job Elsome-Jones, Mill Hill, London, and Leslie James Ellison, Aldwych, London, England, assignors to International Standard Electric Corporation, New York, N. Y.

Application February 25, 1936, Serial No. 65,598
In Great Britain March 1, 1935

3 Claims. (Cl. 175—366)

This invention relates to dry contact rectifiers, and more particularly to such rectifiers in which, on the application of voltage in a particular direction, a film is formed which inhibits the passage of current in that direction. The best example of such rectifiers is one using copper sulphide with an aluminum or magnesium plate as one of the electrodes.

In such rectifiers the film is formed each time the voltage is applied. For one half cycle of alternating voltage applied thereto the device is conducting, and when the voltage is reversed the film is formed. The exact value to which the voltage must rise before a film sufficient to prevent current passing through the device is formed is not the same with all rectifiers even though they may have been manufactured in as nearly an identical manner as possible and have been subjected to identical pretreatment. This value varies also from time to time with the same rectifier.

One consequence of the inequality in the voltage required to form the film is that if two or more such rectifiers are placed in series, the voltage is unequally divided between them and usually one or more rectifiers absorb most of the voltage whilst the others get very little and the rectifying action will not take place. There are fluctuations in the voltage division, now one unit, and then another, taking the major part of the voltage.

According to this invention a resistance is connected in shunt to each rectifier of a plurality of rectifiers connected in series, for the purpose of distributing the applied voltage equally to each rectifier.

This resistance will obviously increase the reverse leak of alternating current, but this disadvantage may be kept to a minimum by a suitable value of the resistance in relation to the resistance of the rectifier. With cupric sulphide rectifiers each having a resistance of 0.83 ohms in one direction and 50.5 ohms in the opposite direction under an applied alternating voltage of 16 R. M. S. volts, a suitable value of resistance has been found to be 95 ohms.

The shunt resistance, besides enabling such rectifiers to be operated efficiently in series, performs other important functions. It is usually considered that the rectification in a cupric sulphide rectifier takes place at one spot only at a time; this spot after a time burns out and a fresh spot takes over. If the resistance offered by a rectifying spot decreases to a value at which the normal voltage applied is sufficient to cause a breakdown, the shunt resistance acts as a spark quench, thus preventing sparking and its deleterious effects on the rectifier. The shunt resistance moreover tends to prevent burning out by limiting the current.

Furthermore, as the resistances are connected across the input supply to the rectifier, they also serve to limit any voltage rise which may occur when the D. C. load is removed, thus enabling the rectifier to work satisfactorily under no load conditions.

A convenient form for the resistances used according to the invention is discs of compressed powder, since a series of these discs can be very conveniently mounted to form a structural part of the rectifier unit. The resistance discs may be mounted on the same spindle as the rectifier discs or may be clamped between the cooling fins on the rectifier discs so as to be mechanically as well as electrically in parallel with the latter.

Figure 2:
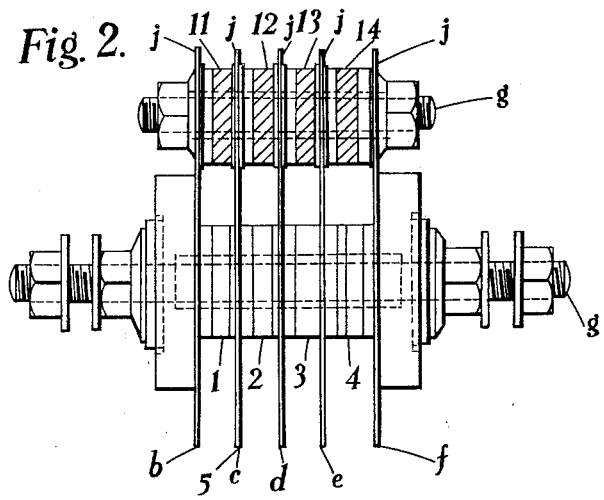
Figure 5:
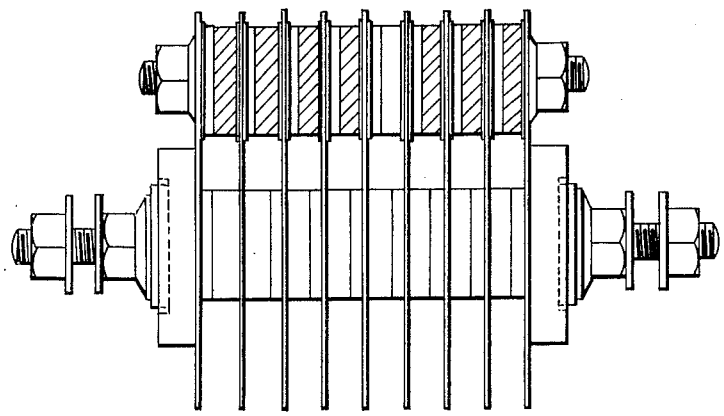
Figure 8:
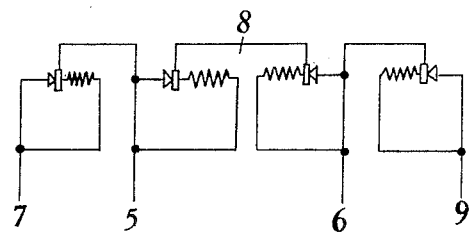
Figure 3:
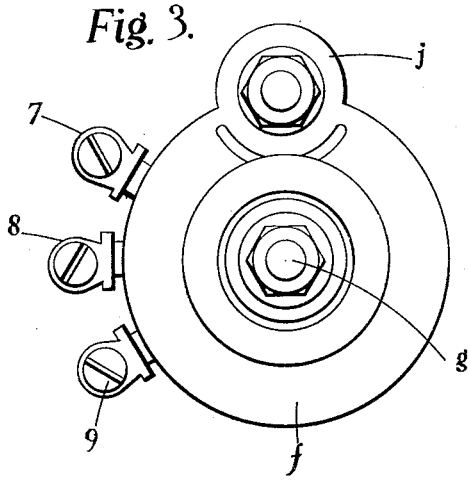
Figure 6:
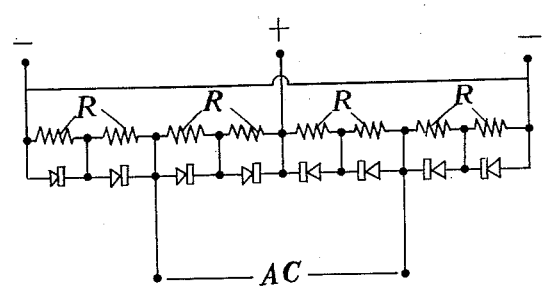
Figure 7:
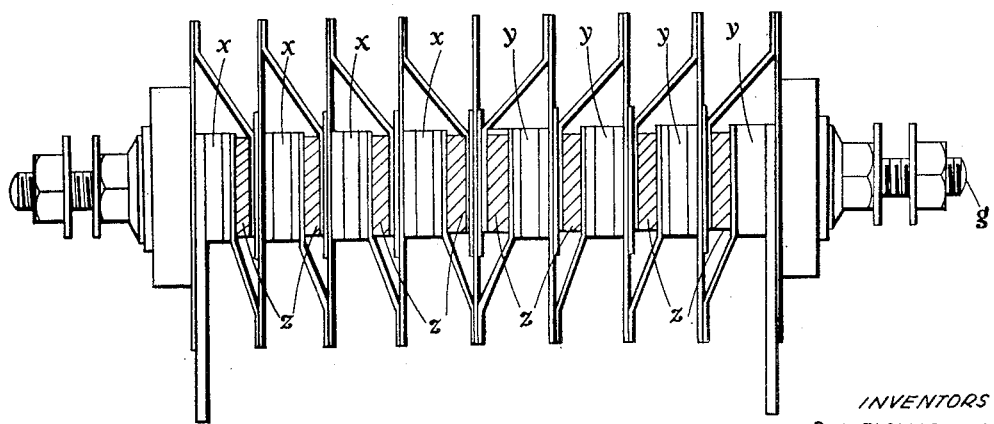

The arrangement of the resistances and the manner of mounting them as part of the rectifier unit will be better understood from the accompanying drawings, in which Figure 1 shows a cross section of a resistance disc, Figures 2, 5 and 7 show rectifier units in longitudinal cross section, Figure 3 is an end view of the rectifier unit shown in Figure 2 and Figures 4, 6 and 8 circuit diagrams.

Figure 1 shows the preferred form of resistance disc, formed as a washer so that several discs can be supported on a spindle. The aperture *a* in the centre is preferably of the same diameter as the aperture in the centre of a rectifier disc. The powder which is compressed to form the resistance disc consists of a mixture of china clay, graphite, gas carbon and asphalt in the proportions of 20, 3, 2 and 2.

Figures 2 and 3 show a rectifier unit forming the usual bridge rectifier, with a rectifier disc in each arm of the bridge. Between each two of the rectifier discs 1, 2, 3, and 4 and at each end of the unit there are large diameter, metal discs *b, c, d, e* and *f* acting as cooling fins. The rectifier discs and cooling fins are mounted on a spindle *g* and clamped together by suitable means. Terminals are attached in any convenient manner to the appropriate cooling fins. Resistance discs 11, 12, 13 and 14 are mounted on a spindle with thin washers *j* of conducting material arranged as shown. Each resistance disc is of the same thickness as a rectifier disc, so that by clamping the discs 11, 12, 13 and 14 and the washers $j$ on the spindle $g$ so that each washer $j$ is against one of the cooling fins $b$, $c$, $d$, $e$, and $f$, the resistances are connected in shunt with the respective rectifiers.

Figure 4:
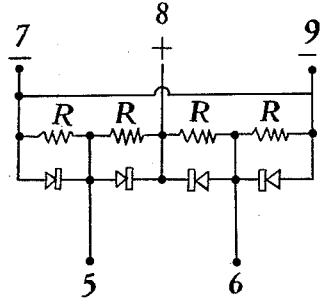

Figure 4 is the circuit diagram of the unit shown in Figs. 2 and 3. The alternating current to be rectified is applied to terminals 5 and 6, whilst the direct current load is connected between terminal 8 and either terminals 7 or 9, 8 being the positive terminal and 7 and 9 negative. The circuit is shown in such a manner that the relation of the elements is spatially the same as in the actual constructional form of the rectifier unit of Figs. 2 and 3. The resistances R represent the discs 11, 12, 13 and 14 of Figure 2.

Figure 5 shows the constructional form of a bridge rectifying circuit with two rectifiers in series in each arm of the bridge and Figure 6 is the corresponding circuit diagram.

Figure 7 shows a different constructional form of the same bridge rectifying circuit in which the resistance discs $z$ are mounted on the same spindle as the rectifiers $x$ and $y$. Each rectifier $x$ and $y$ is associated with a resistance disc $z$, each rectifier and resistance disc being clamped between a pair of cooling fins. The connections necessary to connect the resistance in shunt to its associated rectifier are made by means of metal strips such as $t$. Each strip is formed at one end with a hole through which the spindle $g$ passes and is clamped at that end between two discs or between a disc and a cooling fin. It is then bent over and welded or soldered to another cooling fin. The arrangement of the connections will be clear from Figure 8 which is a diagram of the circuit connections of a four junction bridge rectifier, in which the elements are spatially disposed in the same manner as in the constructional unit. The terminals 5, 6, 7, 8 and 9 correspond to the similarly numbered terminals in Figure 3.

What is claimed is:

1. A rectifying unit comprising a plurality of dry contact metal rectifiers in the form of discs mounted on a central spindle, large diameter metal discs mounted on the said spindle between each rectifier to act as cooling means, and a resistance connected between each of the said last mentioned discs.

2. A rectifying unit comprising a plurality of dry contact metal rectifiers in the form of discs mounted on a central spindle, metal discs extended in diameter beyond said rectifier discs and mounted on said spindle, a spindle passing through all said metal discs near their peripheries, a resistance disc of compressed powdered material mounted on said second mentioned spindle between each of said metal discs and clamping means compressing all said resistance discs on said second mentioned spindle.

3. A rectifying unit comprising a plurality of dry contact metal rectifiers in the form of discs mounted on a central spindle, a disc of compressed powder resistance material mounted on said spindle adjacent each rectifier disc, a metal cooling disc mounted on said spindle adjacent each rectifier disc on the opposite side thereof to its associated resistance disc and a metal connecting piece attached to each metal disc and connecting each resistance disc in parallel with its associated rectifier disc.

RONALD JOB ELSOME-JONES.
LESLIE JAMES ELLISON.